US007462098B2

(12) United States Patent
Arthurs et al.

(10) Patent No.: US 7,462,098 B2
(45) Date of Patent: Dec. 9, 2008

(54) CABIN PRESSURE CONTROL SYSTEM AND METHOD THAT ACCOMMODATES AIRCRAFT TAKE-OFF WITH AND WITHOUT A CABIN PRESSURIZATION SOURCE

(75) Inventors: Timothy R. Arthurs, Tucson, AZ (US); Darrell W. Horner, Oro Valley, AZ (US); Alastair R. Laing, Tucson, AZ (US); Joaquin P. Rabon, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 42 days.

(21) Appl. No.: 11/082,753

(22) Filed: Mar. 16, 2005

(65) Prior Publication Data

US 2006/0211359 A1 Sep. 21, 2006

(51) Int. Cl.
*B64D 13/02* (2006.01)
*G05D 1/08* (2006.01)

(52) U.S. Cl. ........................................ 454/74; 244/180

(58) Field of Classification Search .................. 454/74, 454/76; 244/180

See application file for complete search history.

(56) References Cited

U.S. PATENT DOCUMENTS 3,364,837 A * 1/1968 Schooling .................... 454/74
3,376,803 A 4/1968 Emmons
3,461,790 A * 8/1969 Matulich et al. .............. 454/74
3,974,752 A * 8/1976 Burgess et al. ................ 454/73
4,091,613 A 5/1978 Young
4,164,897 A * 8/1979 Aldrich et al. ................ 454/72
4,434,624 A 3/1984 Cronin et al.
4,487,034 A 12/1984 Cronin et al.
4,553,474 A * 11/1985 Wong et al. ................... 454/74
5,133,646 A 7/1992 Nelson, Sr.
5,186,681 A * 2/1993 Emmons ...................... 454/74
5,299,763 A 4/1994 Bescoby et al.
5,520,578 A 5/1996 Bloch et al.
5,590,852 A 1/1997 Olson
5,911,388 A 6/1999 Severson et al.

(Continued)

FOREIGN PATENT DOCUMENTS

EP 06111086 5/2006

(Continued)

OTHER PUBLICATIONS

European Search Report.

*Primary Examiner*—Steve McAllister
*Assistant Examiner*—Helena Kosanovic
(74) *Attorney, Agent, or Firm*—Oral Caglar, Esq.

(57) ABSTRACT

An aircraft cabin pressure control system implements control logic that significantly reduces potentially uncomfortable pressure bumps that can occur during aircraft take-off rotation both with and without cabin pressuring fluid flowing into the aircraft cabin. The control logic implemented by the cabin pressure control system, among other things, determines whether the cabin pressurizing fluid is flowing into the aircraft cabin. If the cabin pressurizing fluid is flowing into the aircraft cabin, aircraft cabin altitude is controlled to at least a first predetermined minimum altitude value below the take-off altitude. If the cabin pressurizing fluid is not flowing into the aircraft cabin, aircraft cabin altitude is controlled to at least a second predetermined minimum altitude value above the take-off altitude.

7 Claims, 5 Drawing Sheets

U.S. PATENT DOCUMENTS 5,956,960 A 9/1999 Niggeman
6,634,597 B2 * 10/2003 Johnson et al. .......... 244/118.5
6,676,504 B2 * 1/2004 Petri et al. .................... 454/72
6,746,322 B2 * 6/2004 Scheerer et al. ............... 454/74
6,761,628 B2 * 7/2004 Horner ........................ 454/76

FOREIGN PATENT DOCUMENTS

WO WO 2004/102636 A2 11/2004

* cited by examiner

CABIN PRESSURE CONTROL SYSTEM AND METHOD THAT ACCOMMODATES AIRCRAFT TAKE-OFF WITH AND WITHOUT A CABIN PRESSURIZATION SOURCE

TECHNICAL FIELD

The present invention relates to aircraft cabin pressure control and, more particularly, to a system and method for controlling aircraft cabin pressure during a take-off both with and without a cabin pressurization source.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

In addition to a cabin pressure control system, many aircraft also include an environmental control system (ECS) that supplies temperature-controlled ECS air to the aircraft cabin, which also improves passenger comfort. Typically, a flow of bleed air from one or more of the aircraft engines is supplied to the ECS, which in turn conditions the bleed air and supplies the ECS air to the aircraft cabin. The ECS air, when flowing into the aircraft cabin, will also pressurize the aircraft cabin and cause a change in cabin altitude. Thus, the cabin pressure control systems in such aircraft typically include at least an outflow valve and a controller. The outflow valve is mounted on the aircraft bulkhead and, when open, fluidly communicates the aircraft cabin to the environment outside of the aircraft. The controller implements various control laws and supplies appropriate valve control signals to the outflow valve that modulates the position of the outflow valve. As a result, the ECS air supplied to the aircraft cabin is controllably released from the aircraft cabin to the environment outside of the aircraft to thereby control aircraft cabin altitude.

In many instances, the aircraft cabin is not pressurized (relative to the surrounding environment) when the aircraft is on the ground. This allows the aircraft doors to be readily opened and closed to facilitate personnel ingress to and egress from the aircraft. However, once the aircraft is airborne, the cabin is controllably pressurized to attain a cabin altitude, via the cabin pressure control system, working in concert with the ECS, and remains controllably pressurized until the aircraft lands.

As may be appreciated, one of the functional goals of many cabin pressure control systems is to comfortably control cabin altitude during the aircraft take-off rotation. To meet this goal, the cabin pressure control system should comfortably control cabin altitude and cabin altitude rate of change as the aircraft altitude climbs from the initial take-off altitude, while the flow of air from the ECS system may be varying. One method that has been used to help meet this functional goal is to implement logic that pre-pressurizes the aircraft cabin (i.e., lowers cabin altitude) prior to take-off rotation. Such cabin pre-pressurization may be implemented by supplying ECS air to the cabin and commanding the outflow to the closed position.

Aircraft cabin pressure control systems, such as the ones described above, are robustly designed and manufactured, and are operationally safe. Nonetheless, these systems do suffer certain drawbacks. For example, in order to pre-pressurize the aircraft cabin, engine bleed air is needed so that the ECS can supply ECS air to the cabin. However, during the take-off roll in some aircraft, bleed air flow, and thus ECS air flow, may not be available, since the engines may need this additional air to increase engine power output. Moreover, if ECS air flow is not available during the take-off roll, it is subsequently reintroduced in order to properly control cabin altitude during the flight. Thus, the crew and passengers may experience two potentially uncomfortable and/or disconcerting changes in cabin altitude (e.g., cabin pressure), commonly referred to as "pressure bumps." If the cabin pressure control system is implementing the above-mentioned cabin pre-pressurization logic without ECS air flow, the system will command the outflow valve to its closed (or near closed) position. However, since no ECS air is flowing into the cabin, cabin altitude may rise at the same rate as the aircraft, resulting in the first "pressure bump." Thereafter, upon ECS air flow reintroduction, the aircraft cabin may begin pressurizing relatively quickly, which may cause an uncomfortably high cabin climb rate and the second "pressure bump." The cabin pressure control system may additionally overcompensate for the high cabin climb rate, resulting in an uncomfortably high cabin descent rate. This fluctuation in cabin altitude rate may continue until the cabin pressure control system gains control.

Hence, there is a need for a cabin pressure control system that implements a control scheme that overcomes one or more of the above-noted drawbacks. Namely, a cabin pressure control system and method that at least reduces the magnitudes of the pressure bumps that may occur during aircraft take-off without bleed air flow and/or accommodates cabin altitude control during take-off both with and without bleed air flow. The present invention addresses one or more of these needs.

BRIEF SUMMARY

The present invention provides a system and method for controlling aircraft cabin pressure during aircraft take-off rotation both with and without a cabin pressurization source In one embodiment, and by way of example only, in an aircraft having a source of cabin pressurizing fluid for pressurizing an aircraft cabin, a method of controlling altitude in the aircraft cabin during aircraft take-off from a take-off altitude includes determining whether the cabin pressurizing fluid is flowing into the aircraft cabin, and controlling aircraft cabin altitude to at least a first predetermined minimum altitude value below the take-off altitude if the cabin pressurizing fluid is flowing into the aircraft cabin, or at least a second predetermined minimum altitude value above the take-off altitude if the cabin pressurizing fluid is not flowing into the aircraft cabin.

In another exemplary embodiment, an aircraft cabin pressure control system includes a controller and an outflow valve. The controller is adapted to receive a signal representative of whether cabin pressurizing fluid is flowing into the aircraft cabin and is operable, in response thereto, to determine a target cabin altitude value and supply valve command signals. The outflow valve is coupled to receive the valve command signals from the controller and is operable, in response thereto, to selectively move between an open and a closed position, to thereby control aircraft cabin altitude to the target cabin altitude value. If the cabin pressurizing fluid is flowing into the aircraft cabin, the determined target cabin altitude value is at least a first predetermined minimum altitude value below the take-off altitude, and if the cabin pressurizing fluid is not flowing into the aircraft cabin, the determined target cabin altitude value at least a second predetermined minimum altitude value above the take-off altitude.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
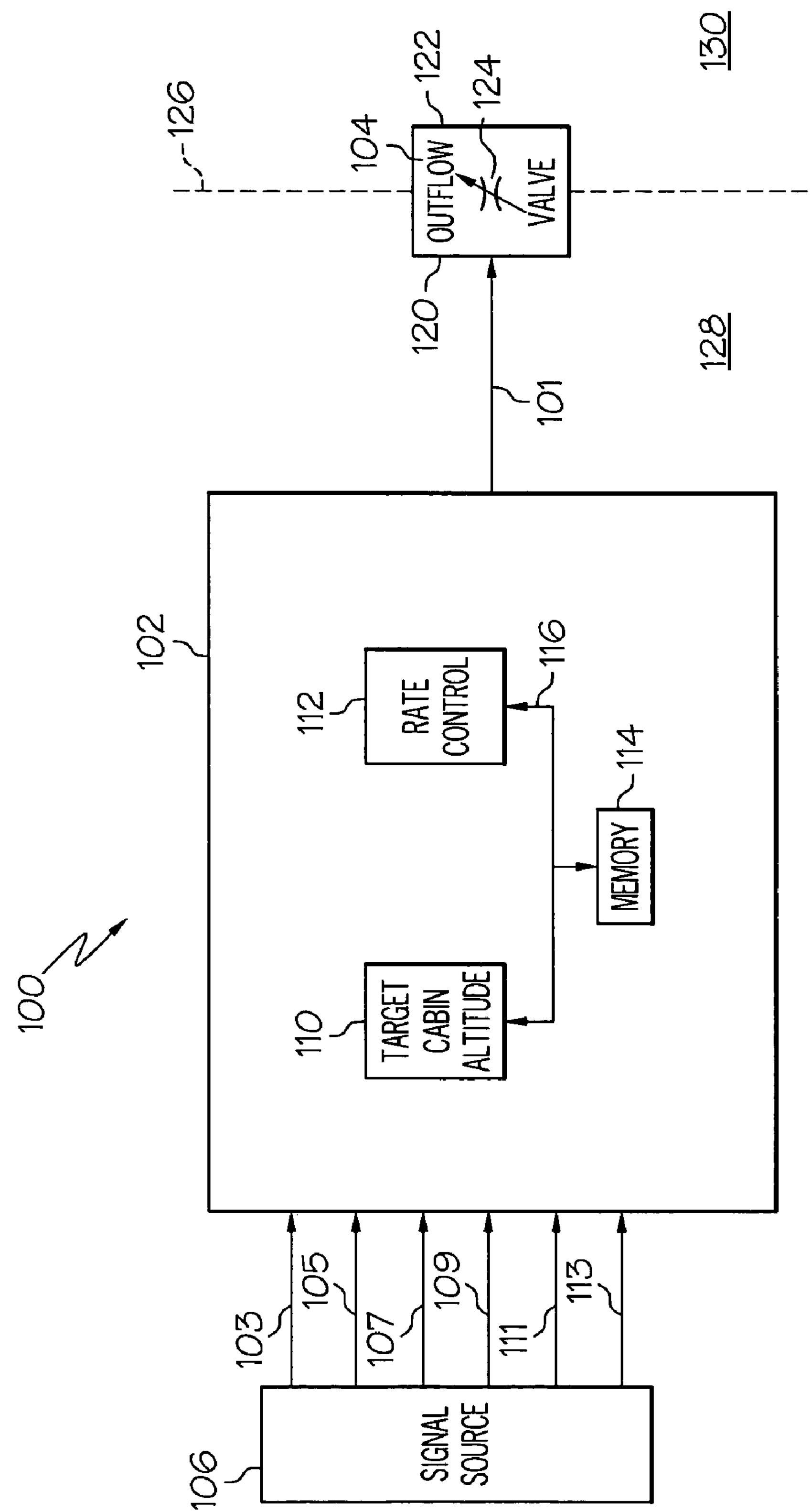
FIG. 1 is a functional block diagram of a cabin pressure control system according to an embodiment of the present invention.

A cabin pressure control system according to an exemplary embodiment is illustrated in FIG. 1. The system 100 includes a controller 102 and an outflow valve 104. The controller 102 is adapted to receive various signals from various one or more signal sources 106. As will be described in more detail below, the controller 102 uses these signals to implement a control logic scheme and to supply valve command signals 101 to the outflow valve 104. The position of the outflow valve 104 varies in response to the valve command signals 101 to thereby control aircraft cabin altitude and aircraft cabin altitude rate of change.

The specific signal sources 106, and the signals supplied therefrom, may vary depending, for example, on the particular type of control logic that the controller 102 is implementing. For example, the signal sources 106 may include the aircraft flight management system (FMS), the aircraft avionics equipment, and/or various sensors. In addition, it will be appreciated that one or more of the signal sources 106 may be included within the controller 102. No matter the specific sources of the signals, in the depicted embodiment, the supplied signals include at least one or more bleed air enable signals 103 representative of whether bleed air is being supplied to the aircraft environmental control system (ECS), one or more flight signals 105 representative of whether the aircraft is in flight, one or more signals representative of the take-off altitude value 107 (e.g., the altitude from which the aircraft is taking off), one or more signals representative of the landing field altitude value 109 (e.g., the altitude of the aircraft landing destination), one or more cabin altitude signals 111 representative of actual cabin altitude, and one or more aircraft altitude signals 113 representative of actual aircraft altitude.

Before proceeding further, it will be appreciated that the signals delineated above and depicted in FIG. 1 are merely exemplary and that various other signals may be supplied to the controller to implement the overall cabin pressure control functionality. For example, depending on the specific control logic being implemented, the controller 102 may additionally receive a signal representative of the aircraft's "top-of-climb" or cruise altitude, and/or a signal representative of cabin-to-atmosphere differential pressure.

Returning once again to the description, it is seen that the controller 102 includes at least a target cabin altitude circuit 110, a rate control circuit 112, and memory 114, all interconnected via a communication bus 116. Although, each of these circuits is depicted as separate functional blocks, it will be appreciated that any two of these circuits, or all three of these circuits, could be physically implemented in a single integrated circuit, and/or may be fully or partially implemented in software. The individual depiction of each circuit is provided solely for additional clarity and ease of description.

The target cabin altitude circuit 110 receives and processes various ones of the signals supplied to the controller 102, and supplies various signals to the rate control circuit 112. In particular, the target cabin altitude circuit 110 receives the bleed air enable signal 103, the flight signal 105, the take-off altitude value signal 107, the landing field altitude value signal 109, the cabin altitude value signal 111, and the aircraft altitude value signal 113 from the signal source 108. The target cabin altitude circuit 110 implements control logic software stored in memory 114 to process the received signals and to supply at least a target cabin altitude signal 115 to the rate control circuit 112. A portion of the control logic software that the target cabin altitude circuit 110 implements will be described in more detail further below.

The rate control circuit 112 receives at least the target cabin altitude signal from the target cabin altitude circuit 110. The rate control circuit 112 implements control logic software stored in memory 114 to process these signals and supply the valve command signals 101 that will selectively move the outflow valve 104 to control aircraft cabin altitude and aircraft altitude rate of change. It will be appreciated that the valve command signals 101 may be supplied directly to the outflow valve 104 or via valve driver circuitry (not illustrated). It will additionally be appreciated that the valve driver circuitry may be included as part of the controller 102 or incorporated into the outflow valve 104.

Though not depicted, it will be appreciated that the controller 102 could additionally include one or more signal conditioning circuits at either, or both, the input and the output of the controller 102. The signal conditioning circuits, if included, would function to, among other things, appropriately condition the signals received by each circuit. For example, if one or more of the signals supplied to the controller are analog signals, an input signal conditioning circuit would include analog-to-digital signal (A/D) conversion circuitry. Similarly, if the valve command signals 101 supplied to the outflow valve 104 need to be analog signals, an output signal conditioning circuit would include digital-to-analog (D/A) conversion. It will additionally be appreciated that either or both the target cabin altitude circuit 110 and the rate control circuit 112 could be configured with on-board signal processing circuitry.

The outflow valve 104 includes an inlet flow port 120, an outlet flow port 122, and a variable area flow orifice 124 located therebetween to regulate fluid flow. The outflow valve 104 is, for example, preferably mounted on an aircraft bulkhead 126 such that the inlet flow port 120 is exposed to the aircraft cabin 128 and the outlet flow port 122 is exposed to the atmosphere outside of the aircraft 130. Thus, during flight the pressure in the aircraft cabin 128 (e.g., cabin altitude), and the rate of change of aircraft cabin altitude, can be controlled by moving the outflow valve variable area flow orifice 124.

The controller 102, as was noted above, implements software control logic to supply the valve command signals 101 to the outflow valve 104, to thereby control aircraft cabin altitude and aircraft cabin altitude rate of change. In particular, the control logic implements this control both during and following aircraft take-off rotation, and both with and without bleed air being supplied to the ECS during aircraft take-off rotation.

As will be described in more detail, when bleed air is being supplied to the ECS, the control logic implemented by the controller 102 results in the controller 102 supplying valve command signals 101 that cause the outflow valve 104 to move toward the closed position prior to, and during, aircraft take-off rotation. Depending on the specific take-off altitude, this may be implemented by controlling cabin altitude to a predetermined target altitude below the take-off altitude. As a result, the cabin will be pre-pressurized, at a controlled rate, to the predetermined target altitude. Conversely, when bleed air is not being supplied to the ECS, the control logic implemented by the controller 102 results in the controller 102 supplying valve command signals 101 that cause the outflow valve 104 to move toward the open position prior to, and during, aircraft take-off rotation. In order to implement this, the cabin altitude is controlled to a predetermined target altitude above the take-off altitude, and a predetermined cabin rate limit that is preferably higher than the maximum aircraft climb rate is established. Once bleed air is enabled, the control logic with bleed air takes over and the outflow valve 104 is controllably moved, if needed, toward the closed position. Moreover, after a predetermined time period the control logic will configure the controller 102 to no longer control to cabin altitude to the predetermined target altitude above the take-off altitude.

Figure 2:
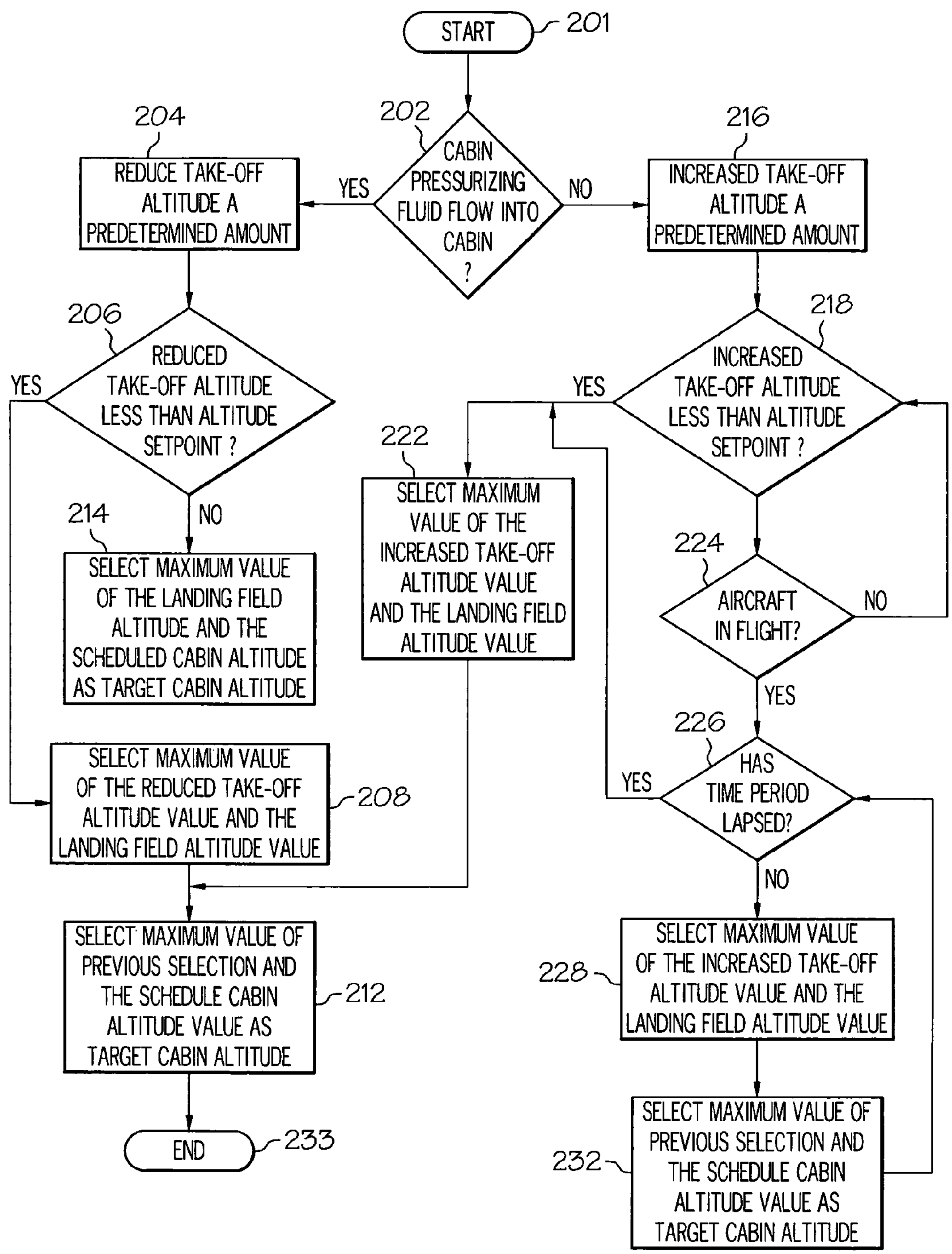
FIG. 2 is a flowchart of an exemplary embodiment of the control logic that may be implemented by the cabin pressure control system of FIG. 1.

The control logic that is implemented in the target cabin altitude circuit 110 both with and without bleed air being supplied to the ECS significantly reduces the potentially uncomfortable and/or disconcerting pressure bumps described above. An exemplary embodiment of a portion of this control logic 200 will now be described in more detail. In doing so, reference should first be made to FIG. 2, which depicts an exemplary embodiment of a portion of the control logic in flowchart form. Moreover, it should be understood that the parenthetical references in the following discussion correspond to the flowchart blocks shown in FIG. 2.

Initially, the target cabin altitude circuit 110 determines whether or not cabin pressurizing fluid is flowing into the aircraft cabin (e.g., whether bleed air flow is being supplied to the ECS) (202). If cabin pressurizing fluid is flowing into the aircraft cabin, the take-off field altitude value is reduced by a predetermined amount (204). The reduced take-off altitude value is then compared to an altitude setpoint value to determine whether the take-off altitude value is less than the setpoint value (206). If the reduced take-off altitude value is less than the setpoint value, the reduced take-off altitude value is compared to the landing field altitude value, and the greater of the two values is selected (208). Thereafter, the selected value from the previous comparison is compared to the scheduled cabin altitude value, and the greater of the two values is selected as the target cabin altitude (212). If, however, the increased take-off altitude value is not less than the setpoint, then the landing field altitude value is compared to the scheduled cabin altitude value, and the greater of the two values is selected as the target cabin altitude (214). In either case, using additional convention control logic that is not illustrated or further described, the target cabin altitude circuit 110 and the rate control circuit 112 then control aircraft cabin altitude to the selected target cabin altitude.

Before describing the control logic 200 when cabin pressurizing fluid is not flowing into the aircraft cabin, it will be appreciated that the scheduled cabin altitude value is the desired cabin altitude for the existing aircraft altitude, and is determined using control logic that is not depicted or further described herein. The control logic that is used to determine the scheduled cabin altitude value may be implemented using any one of numerous known cabin pressure control logic schemes including, but not limited to adaptive control logic, reactive control logic, or fixed-rate control logic. No matter which specific control logic type is implemented, it will be appreciated that cabin pressure control system 100 will control aircraft cabin altitude while limiting the cabin-to-atmosphere differential pressure and limiting cabin altitude rate of change within a substantially comfortable range.

Returning now to the control logic description, if cabin pressurizing fluid is not flowing into the aircraft cabin, the take-off field altitude value is increased by a predetermined amount (216). The increased take-off altitude value is then compared to an altitude setpoint value to determine whether the take-off altitude value is less than the setpoint value (218). If the increased take-off altitude value is less than the setpoint value, the increased take-off altitude value is compared to the landing field altitude value, and the greater of the two values is selected (222). Thereafter, the selected value from the previous comparison (218) is compared to the scheduled cabin altitude value, and the greater of the two values is selected as the target cabin altitude (222). Thereafter, as described above, the target cabin altitude circuit 110 and the rate control circuit 112 control aircraft cabin altitude to the target cabin altitude using additional convention control logic.

If the increased take-off altitude value is not less than the setpoint value, the control logic determines whether the aircraft is in flight (224). If the aircraft is not in flight, the previous comparison is repeated until the aircraft is in flight. It will be appreciated that this may be determined using any one of numerous systems and methods, but is preferably determined using the aircraft WOW sensor (not shown). Once the aircraft is in flight, the logic determines whether a predetermined time period has lapsed (226). Until the time period has lapsed, the increased take-off altitude value is compared to the landing field altitude value, and the greater of the two values is selected (228). The selected value from the previous comparison (228) is compared to the scheduled cabin altitude value, and the greater of the two values is selected as the target cabin altitude (232). When the time period lapses, the landing field altitude value is compared to the scheduled cabin altitude value, and the greater of the two values is selected as the target cabin altitude value. Thereafter, as described above, the target cabin altitude circuit 110 and the rate control circuit 112 control aircraft cabin altitude to the target cabin altitude using additional convention control logic.

Figure 3:
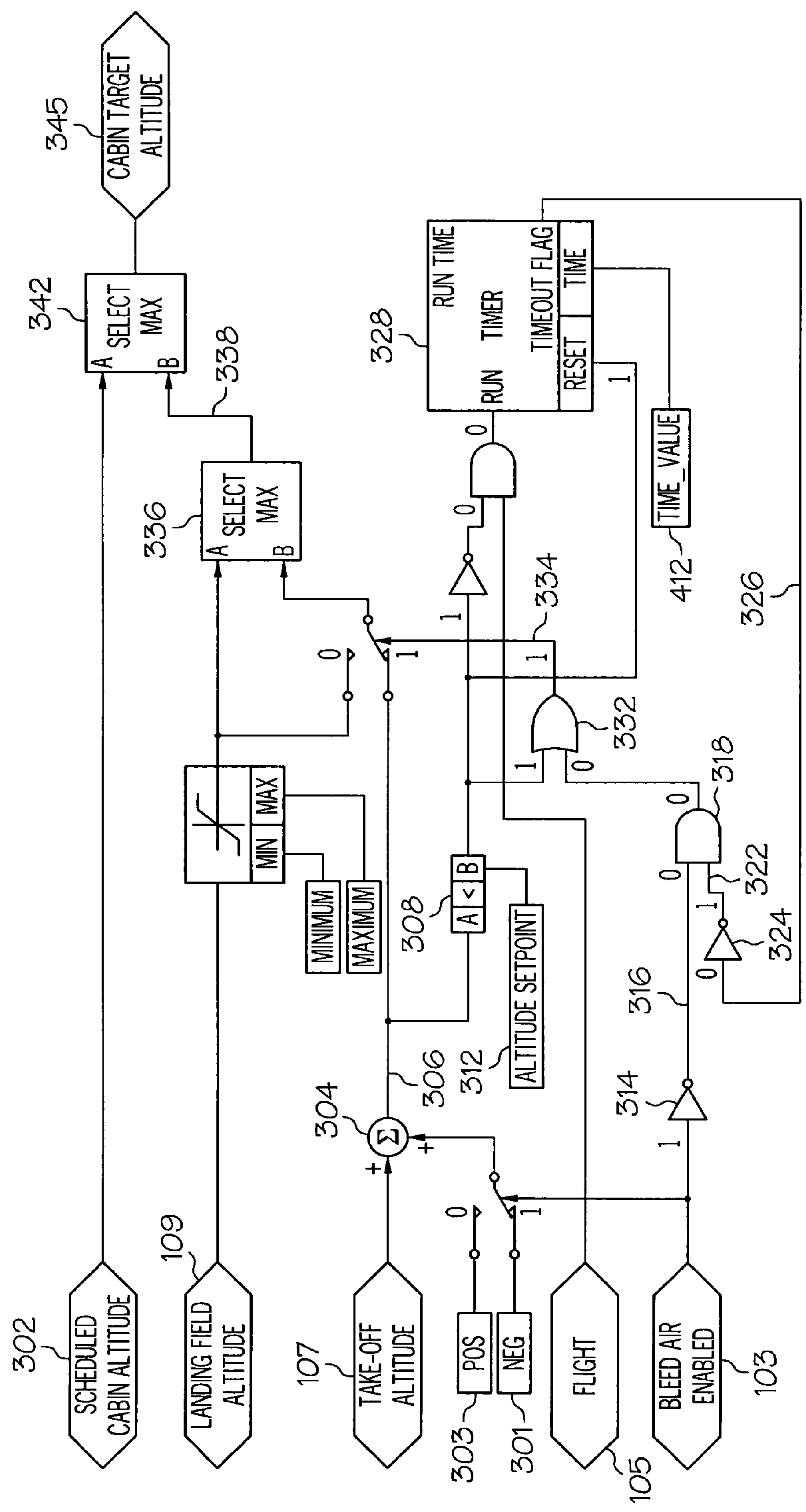
FIG. 3 is a simplified control logic functional block diagram that implements the control logic of FIG. 2, and is shown in a configuration when cabin pressurizing fluid is flowing into the aircraft cabin.
Figure 4:
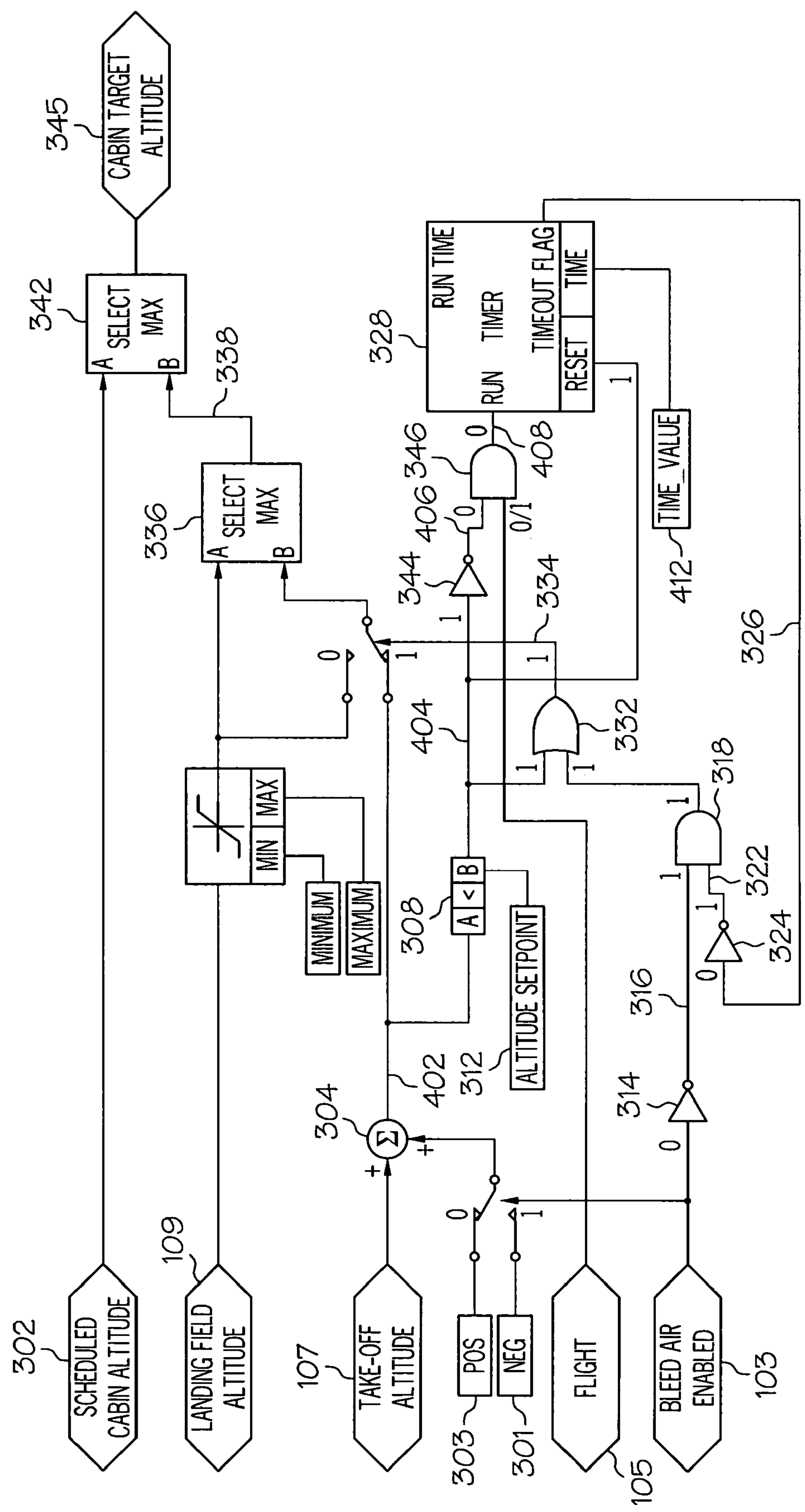
FIGS. 4 and 5 are each simplified control logic functional block diagram that implements the control logic of FIG. 2, and are shown in a configuration when cabin pressurizing fluid is not flowing into the aircraft cabin.
Figure 5:
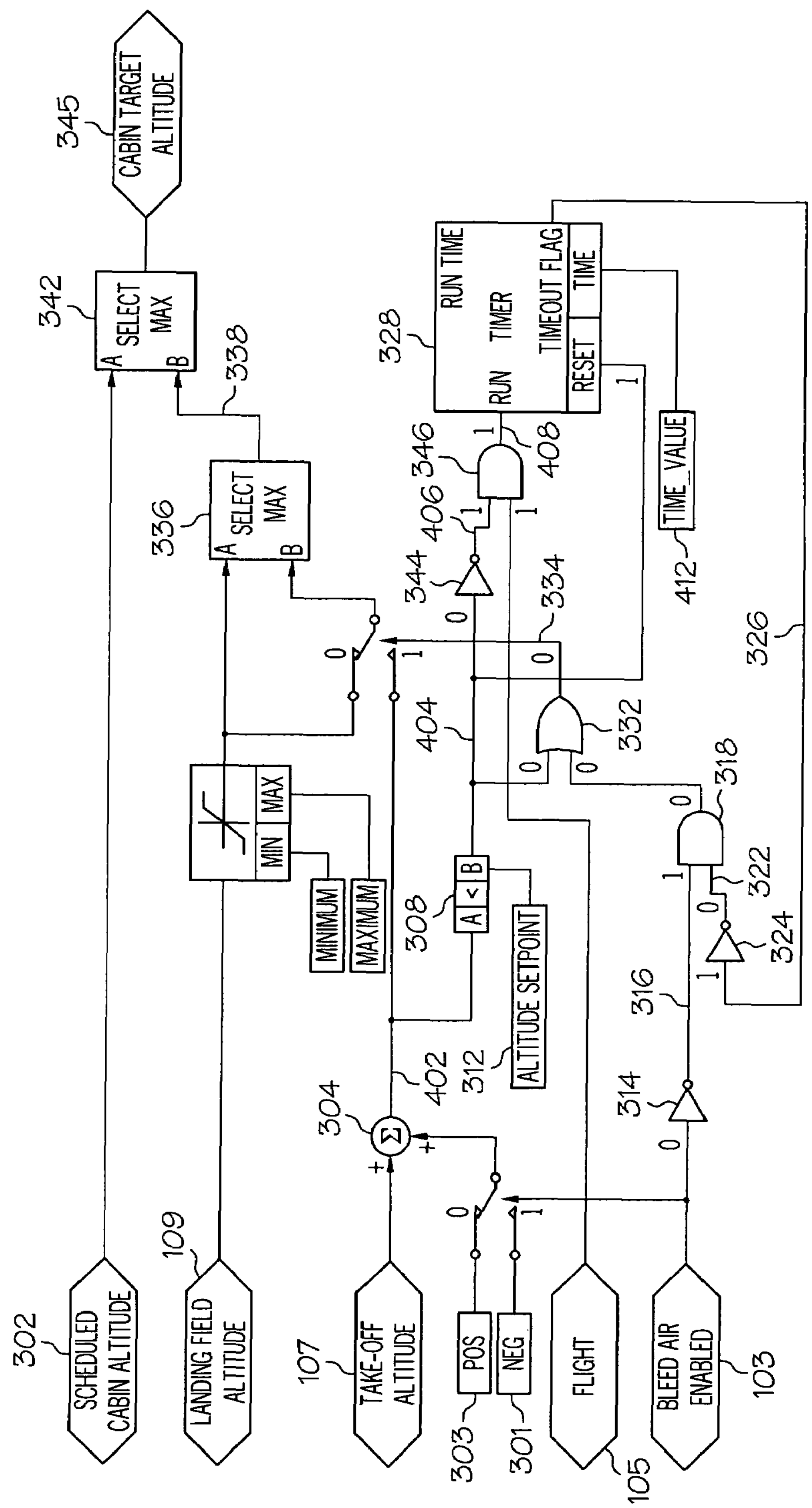

Turning now to FIGS. 3-5, an alternative representation of the control logic 200, showing its configuration when cabin pressurizing air is and is not flowing, is illustrated and will now be described. Before doing so, however, it is noted that the exemplary control logic 200 is, in these alternative representations, depicted using various schematic symbols that represent physical components. It will be appreciated that this is done for clarity and ease of description, and that the control logic could be implemented using one or more of these discrete physical components or it be fully implemented in software.

Turning first to FIG. 3, it is seen that the control logic 200 receives at least the bleed air enable signal 103, the flight signal 105, the take-off altitude value 107, and the landing field altitude value 109 from the signal sources 106. In addition, the logic 200 also receives a signal representative of the scheduled cabin altitude value 302, which was described above. The bleed air enable signal 103, as was previously noted, is representative of whether or not bleed air is being supplied to the ECS, and thus whether or not cabin pressurizing fluid (e.g., ECS air) is flowing into the aircraft cabin. In the depicted embodiment, if bleed air is enabled, the signal is representative of a logic "1" and if it is not enabled, the signal is representative of a logic "0." Each of these scenarios, and the operation of the control logic 200 during each, will be described in turn, beginning first with bleed air being enabled, which is shown in FIG. 3.

If the bleed air enable signal 103 is a logic "1," meaning that bleed air is available, a predetermined negative value 301 is supplied to a summer circuit 304. The summer circuit 304 also receives the take-off altitude value 107, and functions to sum the two values together. Thus, as previously described, the take-off altitude value 107 is reduced the predetermined amount, thereby supplying a first predetermined minimum altitude value 306. This first predetermined minimum altitude value 306 is supplied to a first comparison function 308, which compares the first predetermined minimum altitude value 306 to the altitude setpoint value 312. If the first predetermined minimum altitude value is less than the altitude setpoint value 312, the first comparison function 308 supplies a logic "1" signal. Conversely, if the first predetermined minimum altitude value is not less than the altitude setpoint value 312, the first comparison function 308 supplies a logic "0" signal. In the depicted example, it is assumed that the first predetermined minimum altitude value is less than the altitude setpoint value 312. Before proceeding further, it will be appreciated that the specific values chosen for the predetermined negative value 301 and the altitude setpoint value 312 may vary from, for example, aircraft-type to aircraft-type; however, in the depicted embodiment the predetermined negative value 301 is −150 feet, and the altitude setpoint value 312 is 8,000 feet.

Returning now to the description, it is seen that the bleed air enable signal is supplied to a first inverter 314, which in turn supplies an inverted bleed air enable signal 316. Thus, since the bleed air enable signal 103 is a logic "1" signal, the inverted bleed air enable signal 316 is a logic "0" signal, which is supplied to a first logic AND gate 318. The first logic AND gate 318 has two inputs, one that receives the inverted bleed air enable signal 316, and another that receives an inverted timeout signal 322 from a second inverter 324. The second inverter 324 receives a timeout signal 326 from a timer circuit 328. The timer circuit 328 is used to establish the predetermined time period that was described above, and will be described in more detail further below. In the depicted embodiment, the timeout signal 326 is a logic "0" signal and the inverted timeout signal 322 is thus a logic "1" signal. Of course, no matter the logic level of the inverted timeout signal 322, the output of the first logic AND gate 318 is a logic "0" signal since the inverted bleed air enable signal 316 is a logic "0."

The output of the first logic AND gate 318 and the output of the first comparison function 308 are each supplied to separate inputs of a two-input logic OR gate 332. Because in FIG. 3 one of the logic OR inputs is receiving a logic "1" signal, the logic OR gate 332 will also supply a logic "1" signal 334. As a result, the first predetermined minimum altitude value 306 is supplied to a second comparison function 336. The second comparison function 336 compares the first predetermined minimum altitude value 306 to the landing field altitude value 109 and, as was noted above, selects the greater of the two values and supplies a selected altitude value 338 to a third comparison function 342.

The third comparison function 342 functions similar to the second comparison function 336 in that it compares to two input values and selects the greater of the two. In the depicted embodiment, the third comparison function receives the selected altitude value 338 supplied from the second comparison function 336 and the scheduled cabin altitude value 302, and supplies the greater of the two values as the target cabin altitude signal 345. As previously mentioned, the target cabin altitude circuit 110 and the rate control circuit 112, based on the target cabin altitude signal 345, control aircraft cabin altitude to the target cabin altitude value using additional convention control logic and circuitry.

Turning now to FIG. 4, operation of the control logic 200 when bleed air is not enabled and the aircraft is not implementing a high altitude take-off will now be described. In this configuration, the bleed air enable signal 103 is a logic "0" signal. Thus, a predetermined positive value 303 is supplied to a summer circuit 304. As with the predetermined negative value 301, it will be appreciated that the specific value chosen for the predetermined positive value 303 may vary from, for example, aircraft-type to aircraft-type; however, in the depicted embodiment the predetermined positive value 303 is +1,000 feet.

No matter the specific value of the predetermined positive value 303, the summer circuit 304 sums the predetermined positive value 303 and the take-off altitude value 107. Thus, the take-off altitude value 107 is increased the predetermined amount to a second predetermined minimum altitude value 402, which is supplied to the first comparison function 308. The first comparison function 308 compares the second predetermined minimum altitude value 402 to the altitude setpoint value 312. In FIG. 4, the second predetermined minimum altitude value 402 is less than the altitude setpoint value 312. Thus, the first comparison function 308 supplies a logic "1" signal 404 to both the logic OR gate 332 and to a third inverter circuit 344. Because the input to the third inverter circuit 344 is a logic "1" signal 404, the third inverter output signal 406 is a logic "0" signal, which is supplied to a second logic AND gate 346.

The second logic AND gate 346 is coupled to receive not only the third inverter output signal 406, but the flight signal 105, as well. The flight signal 105, as noted above, is a signal representative of whether the aircraft is in flight. In the depicted embodiment, the flight signal 105 is a logic "1" signal if the aircraft is in flight, otherwise it is a logic "0" signal. Nonetheless, because the third inverter output signal 406 is a logic "0" signal, the output of the second logic AND gate 346 is a logic "0" signal 408. This means that the timer circuit 328 will not be enabled to run, which means the timeout signal 326 is a logic "0" signal, which in turn means the inverted timeout signal 322 is a logic "1" signal.

As FIG. 4 also shows, because the bleed air enable signal 103 a logic "0" signal, the inverted bleed air enable signal 316 is a logic "1" signal. As was jut noted, the inverted timeout signal 322 is a logic "1" signal, which means that the first logic AND gate 318 supplies a logic "1" signal to the logic OR gate 332. In FIG. 4, both of the logic OR inputs are receiving logic "1" signals. Thus, the logic OR gate 332 supplies a logic "1" signal 334. This results in the second predetermined minimum altitude value 402 being supplied to the second comparison function 336. The second comparison function 336 compares the second predetermined minimum altitude value 402 to the landing field altitude value 109, selects the greater of the two values, and supplies the selected altitude value 338 to the third comparison function 342. The third comparison function 342 in turn compares the selected altitude value 338 and the scheduled cabin altitude value 302, and supplies the greater of the two values as the target cabin altitude signal 115.

With reference now to FIG. 5, operation of the control logic 200 when bleed air is not enabled and the aircraft is implementing a high altitude take-off will now be described. It will be appreciated that the term "high altitude take-off" may vary from aircraft-type to aircraft-type. However, as used herein it refers to a take-off from a take-off altitude that is greater than or equal to the altitude setpoint value 312. During this scenario, the bleed air enable signal 103 is again a logic "0" signal, which means the predetermined positive value 303 is supplied to the summer circuit 304, and the second predetermined minimum altitude value 402 is supplied to the first comparison function 308. The first comparison function 308 in turn compares the second predetermined minimum altitude value 402 to the altitude setpoint value 312.

In FIG. 5, the second predetermined minimum altitude value 402 is not less than the altitude setpoint value 312. Thus, the first comparison function 308 supplies a logic "0" signal 404 to the logic OR gate 332, the third inverter circuit 344, and a "reset" input of the timer circuit 328. Because the input to the third inverter circuit 344 is a logic "0" signal 404, the third inverter output signal 406 is a logic "1" signal, which is supplied to the second logic AND gate 346. As noted above, the second logic AND gate 346 is also coupled to receive the flight signal 105. Thus, until the aircraft is in flight, the control logic 200 is otherwise configured, and operates substantially identical, to the control logic 200 depicted in FIG. 4. However, once the aircraft is in flight, the flight signal 105 becomes a logic "1" signal. This means that the output of the second logic AND gate 346 becomes a logic "1" signal 408, which enables the timer circuit 328 to run.

The timer circuit 328, once it is enabled to run, will do so for a predetermined time period 412. While the timer circuit 328 is running, the timeout signal 326 is a logic "0" signal. When the timer circuit 328 times out after the predetermined time period, the timeout signal 326 then transitions to a logic "1" signal. It will thus be appreciated that until the timer circuit 328 times out following the predetermined time period, the control logic 200 continues to operate substantially identical to the control logic 200 depicted in FIG. 4. It will be appreciated that the predetermined time period 412 is a time value that may vary from, for example, aircraft-type to aircraft-type, and may be either a set value established in software or a variable value set by the pilot. In the depicted embodiment, however, the predetermined time period 412 is a fixed value that is set to about 90 seconds. This ensures that the control logic 200 will allow the controller 102 to command the outflow valve 104 to move to the closed position at least after the predetermined time period has lapsed, even if bleed air has not been enabled.

Once the predetermined timer period has lapsed, the timeout signal 326 becomes a logic "1" signal, which means the inverted timeout signal 322 becomes a logic "0" signal. Thus, no matter the state of the inverted bleed air enable signal 316, the first logic AND gate 318 supplies a logic "0" signal to the logic OR gate 332. This means that both of the logic OR inputs are receiving logic "0" signals, resulting in the logic OR gate 332 supplying a logic "0" signal 334. With the logic OR gate supplying a logic "0" signal, the second comparison function 336 receives the landing field altitude value 109 on both of its inputs. Thus, the selected altitude value 338 supplied to the third comparison function 342 is always the landing field altitude value 109. This in turn means that the target cabin altitude signal 345 supplied by the third comparison function 342 is the greater of the landing field altitude value 109 and the scheduled cabin altitude value 302.

The control logic 200 implemented in the target cabin altitude circuit 110 and described herein significantly reduces potentially uncomfortable and/or disconcerting pressure bumps that can occur during aircraft take-off rotation, both with and without bleed air being supplied to the ECS.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In an aircraft having a source of cabin pressurizing fluid for pressurizing an aircraft cabin, a computer readable medium for setting a target cabin altitude in the aircraft cabin during and after aircraft take-off from a take-off altitude, comprising:

program code for determining whether the cabin pressurizing fluid is flowing into the aircraft cabin;

program code for setting the target cabin altitude to (i) at least a first predetermined minimum altitude value below the take-off altitude if the cabin pressurizing fluid is flowing into the aircraft cabin or (ii) at least a second predetermined minimum altitude value above the take-off altitude if the cabin pressurizing fluid is not flowing into the aircraft cabin; and program code for determining a landing field altitude value, the landing field altitude value corresponding to an altitude of a landing destination of the aircraft;

program code for determining actual aircraft altitude;

program code for determining a scheduled cabin altitude value based on the determined actual aircraft altitude;

program code for comparing the landing field altitude value to the first predetermined minimum value to determine which is larger in value;

program code for comparing the larger of the landing field altitude value and the first predetermined minimum altitude value to the scheduled cabin altitude value to determine which is largest in value; and if the cabin pressurizing fluid is flowing into the aircraft cabin, program code for controlling air flow through an outflow valve to set the target cabin altitude to the altitude value that is largest in value, wherein the target cabin altitude corresponds to a desired cabin altitude.

2. The computer readable medium of claim 1, further comprising:

program code for comparing the landing field altitude to the second predetermined minimum value to determine which is larger in value;

program code for comparing the larger of the landing field altitude and the second predetermined minimum altitude value to the scheduled cabin altitude value to determine which is the largest in value; and program code for setting the target cabin altitude to the altitude that is largest in value, if the cabin pressurizing fluid is not flowing into the aircraft cabin.

3. The computer readable medium of claim 1, further comprising:

program code for determining a landing field altitude, the landing field altitude corresponding to an altitude of a landing destination of the aircraft;

program code for determining if the aircraft is in flight;

program code for determining if the take-off altitude is above an altitude setpoint value; and program code for setting the target cabin altitude to at least the landing field altitude for a predetermined time period after determining the aircraft is in flight, whether or not the cabin pressurizing fluid is flowing into the aircraft cabin.

4. The computer readable medium of claim 3, further comprising:

program code for determining actual aircraft altitude;

program code for determining a scheduled cabin altitude value based on the determined actual aircraft altitude;

program code for comparing the landing field altitude to the scheduled cabin altitude value to determine which is largest in value; and program code for setting the target cabin altitude to the altitude value that is largest in value.

5. The computer readable medium of claim 1, further comprising:

program code for automatically controlling aircraft cabin altitude rate of change to a predetermined rate magnitude until the target cabin altitude value is attained.

6. The computer readable medium of claim 5, wherein:

the aircraft cabin altitude is configured to climb at a predetermined climb rate; and the predetermined rate magnitude is limited to a value greater than the predetermined climb rate.

7. In an aircraft having a source cabin pressurizing fluid for pressurizing an aircraft cabin, a computer readable medium for setting a target cabin altitude in the aircraft cabin during and after aircraft take-off from a take-off altitude, comprising:

program code for determining whether the cabin pressurizing fluid is flowing into the aircraft cabin;

program code for determining a landing field altitude value, the landing field altitude value corresponding to an altitude of a landing destination of the aircraft;

program code for determining actual aircraft altitude;

program code for determining a scheduled cabin altitude value based on the determined actual aircraft altitude;

program code for;

(i) comparing the landing field altitude value to a first predetermined minimum altitude value to determine which is larger in value, the first predetermined minimum altitude (ii) comparing the larger of the landing field altitude value and the first predetermined minimum altitude value to the scheduled cabin altitude value to determine which is largest in value, and (iii) setting the target cabin altitude to the altitude value that is largest in value, if the cabin pressurizing fluid is flowing into the aircraft cabin; and program code for;

(i) comparing the landing field altitude to a second predetermined minimum altitude value to determine which is larger in value, (ii) comparing the larger of the landing field altitude and the second predetermined minimum altitude value to the scheduled cabin altitude value to determine which is largest in value, and (iii) setting the target cabin altitude to the altitude value that is largest in value, if the cabin pressurizing fluid is not flowing into the aircraft cabin; and wherein the step of setting the target cabin altitude comprises controlling air flow through an outflow valve, wherein the target cabin altitude corresponds to a desired cabin altitude, the first predetermined minimum altitude value is below the take-off altitude, and the second predetermined minimum altitude value is above the take-off altitude.

* * * * *